(12) United States Patent
Pope

(10) Patent No.: US 8,184,674 B2
(45) Date of Patent: May 22, 2012

(54) TIME-HOPPING LOW-POWER WIRELESS NETWORK FOR TURNING OFF AND ON FLUORESCENT LAMPS

(75) Inventor: Steven M. Pope, Los Gatos, CA (US)

(73) Assignee: IXYS CH GmbH (CH)

(*) Notice: Subject to any disclaimer, the term of this patent is extended or adjusted under 35 U.S.C. 154(b) by 416 days.

(21) Appl. No.: 12/587,106

(22) Filed: Sep. 30, 2009

(65) Prior Publication Data

US 2011/0076950 A1 Mar. 31, 2011

(51) Int. Cl.
*H04B 1/00* (2006.01)

(52) U.S. Cl. ........ 375/138; 375/132; 375/135; 375/219; 455/67.11

(58) Field of Classification Search .................. 375/138, 375/135, 132, 219; 455/67.11; 315/138, 315/312

See application file for complete search history.

(56) References Cited

U.S. PATENT DOCUMENTS

| | | | | |
|---|---|---|---|---|
| 5,610,907 | A * | 3/1997 | Barrett | 370/342 |
| 6,859,644 | B2 | 2/2005 | Wang | 455/159.2 |
| 7,116,986 | B2 * | 10/2006 | Jenkins et al. | 455/456.1 |
| 7,307,542 | B1 | 12/2007 | Chandler et al. | 340/825.52 |
| 7,446,671 | B2 | 11/2008 | Giannopoulos et al. | 340/825.72 |
| 7,554,274 | B2 | 6/2009 | Wang et al. | 315/317 |
| 7,573,933 | B2 * | 8/2009 | Molisch et al. | 375/138 |
| 2006/0044152 | A1 | 3/2006 | Wang | 340/825 |
| 2009/0026966 | A1 | 1/2009 | Budde et al. | 315/152 |

OTHER PUBLICATIONS

Sinem Coleri Ergen, "ZigBee/IEEE 802.15.14 Summary", Sep. 10, 2004, pp. 1-35.
Mikhail Galeev, "Embedded Systems Programming: Will Bluetooth, ZigBee, and 802.11 all have a place in your home? Here's what ZigBee offers for home wireless networking", Apr. 20, 2004, pp. 1-6.
Dan Strassberg, "Simple networks will free many sensors from wires", Apr. 13, 2006, pp. 2-3.
G. Bhatti, A. Mehta, Z. Sahinoglu, J. Zhang, and R. Viswanathan, "Modified Beacon-Enabled IEEE 802.15.4 MAC for Lower Latency", Apr. 2009, pp. 1-6.
Jeffrey Z. Tao, Shivendra S. Panwar, Daqing Gu, Jinyun Zhang, "Performance Analysis for the IEEE 802.15.4 Contention Access Period", downloaded Sep. 2009, pp. 2-19.
Atmel Corporation, "ATAVRFBKIT/EBLB001 Dimmable Fluorescent Ballast User Guide", Oct. 2007, pp. 1-32.
Bob Nelson and Chris Marshall, "Request for Specification Input (RSI) Technical Requirements Document", Apr. 26, 2000, pp. 2-19.

(Continued)

*Primary Examiner* — Ted Wang
(74) *Attorney, Agent, or Firm* — Imperium Patent Works; T. Lester Wallace

(57) ABSTRACT

A low-power wireless network involves a master and a plurality of RF-enabled fluorescent lamp starter units. In each of a plurality of intervals, a starter wakes up and listens for a beacon, regardless of whether a beacon is transmitted during that interval or not. The starter operates in a low power sleep mode during the majority of the interval. The master can transmit during the beacon slot time of any interval, but typically only transmits frequently enough to maintain starter synchronization. If the master wishes to communicate with the starters with reduced latency, then the master can transmit a beacon in the next interval. Beacon slot time is varied within the interval (for example, from interval to interval or from group of intervals to group of intervals) in a pseudo-random time-hopping fashion known to both the starters and the master, thereby reducing persistence of collisions with similar networks.

20 Claims, 13 Drawing Sheets

NORMAL MODE

OTHER PUBLICATIONS

Patrick Kinney, "ZigBee Technology: Wireless Control that Simply Works", Oct. 2, 2003, pp. 2-21.
Bob Heile, "Wireless Sensors and Control Networks: Enabling New Opportunities with ZigBee", Dec. 2006, pp. 2-52.
Royal Philips Electronics, Samsung Electronics Co., Ltd., Sony Corporation and ZigBee Alliance, "Zigbee and RF4CE Set New Course for Consumer Electronic Remote Controls", Mar. 3, 2009, pp. 1-3.
Bo Gao and Chen He, "An Individual Beacon Order Adaptation Algorithm for IEEE 802.15.4 Networks", May 2008, pp. 12-16.
Francis Rubenstein, "After DALI: A Look at What's Next", Jan. 16, 2005, pp. 3-4.
Dali Specification Guide, downloaded Sep. 2009, pp. 5-71.
Daintree Networks, "Introducing ZigBee RF4CE", Apr. 2009, pp. 1-4.
Module: ZigBee Overview, downloaded Sep. 2009, pp. 1-34.
Yao-Jung Wen, "Wireless Sensor and Actuator Networks for Lighting Energy Efficiency and User Satisfaction", Fall 2008, pp. 1-261.
Liang Cheng, "IEEE 802.15.4 MAC Protocol Study and Improvement", Dec. 2007, pp. 1-86.

* cited by examiner

TWO NETWORKS OF
FLUORESCENT LAMP STARTER UNITS

| 2 | 2 | 1 | 2 | 2 | 1 | 1 | 1 | 2 | 1 | 2 |
|---|---|---|---|---|---|---|---|---|---|---|
| SOF | NID | LEN | DST | SRC | FTY | CUA | CMD | CTA | DAT | EOF |

BEACON

FIG. 2

| ABBR. | FIELD | BYTES |
|---|---|---|
| SOF | START OF FRAME | 2 |
| NID | NETWORK ID | 2 |
| LEN | LENGTH OF FOLLOWING FIELDS UNTIL EOF | 1 |
| DST | DESTINATION ADDRESS (GROUP ADD OF UNITS TO RECEIVE THE BEACON) | 2 |
| SRC | SOURCE ADDRESS (ADD OF MASTER THAT TRANSMITTED THE BEACON) | 2 |
| FTY | FRAME TYPE | 1 |
| CUA | COUNT UNTIL ACTION | 1 |
| CMD | COMMAND<br>00000001 = LAMP ON<br>00000010 = LAMP OFF<br>00000011 = PUT INTO REGISTRATION MODE<br>00000100 = STATUS REQUEST<br>00000101 = PUT INTO SYNCHRONIZATION MODE<br>00000110 = PUT INTO NORMAL MODE | 1 |
| CTA | COMMAND TARGET ADDRESS (UNIT TO RESPOND TO THE COMMAND) | 2 |
| DAT | DATA (E.G. INTENSITY, TABLE LOOKUP FUNCTION INDEX) | N |
| EOF | END OF FRAME (CRC CHECK) | 2 |

160 US IS REQUIRED TO TRANSMIT EACH BYTE AT 50 KBPS

MINIMUM BEACON IS 17 BYTES AND REQUIRES 2.72 MS TO TRANSMIT

BEACON

FIG. 3

RF-ENABLED STARTER UNIT

RF-ENABLED STARTER UNIT

NORMAL MODE

NORMAL MODE (EMBODIMENT #1)

SYNCHRONIZATION MODE

INITIAL CONDITION

PREHEATING

HIGH VOLTAGE

IGNITION AND USAGE

TURN OFF - STEP ONE

TURN OFF - STEP TWO

TURN OFF - STEP THREE

TURN OFF COMPLETE

TIME-HOPPING LOW-POWER WIRELESS NETWORK FOR TURNING OFF AND ON FLUORESCENT LAMPS

TECHNICAL FIELD

The described embodiments relate to low-power wireless networks, and more particularly to a low-power wireless network involving RF-enabled fluorescent lamp starter units that are controlled by a battery-powered occupancy detector.

BACKGROUND INFORMATION

Many wireless protocols and systems have been used or have been proposed for use in controlling lighting systems. Some of these protocols and systems include IEEE 802.11 Wi-Fi, Bluetooth, X10, Z-Wave, INSTEON, nanoNET and ZigBee. Each of these protocols has its advantages and disadvantages. In one proposed ZigBee-based lighting control system, a central device referred to as the coordinator communicates wirelessly with multiple endpoint devices in a star topology. Each endpoint device is a Reduced Function Device (RFD) that is embedded in a lighting fixture. The central coordinator, on the other hand, is a Full Function Device (FFD) that can be made to turn on and to turn off the lighting fixtures by sending Radio Frequency (RF) communications to the endpoint devices. The coordinator and each of the endpoints realizes a ZigBee protocol stack. The first two layers of the ZigBee stack, the physical layer (PHY) and medium access control layer (MAC), are defined by the IEEE 802.15.4 networking standard. Two higher layers of the ZigBee stack, the network layer (NWK) and the application support sub-layer (APS), are specified by the ZigBee standard. User-defined application device objects (ZDO), along with the APS sub-layer, together constitute the application layer (APL) of the ZigBee stack. Additional information on the ZigBee stack can be obtained from The ZigBee Alliance, 2400 Camino Ramon, Suite 375, San Ramon, Calif. 94583, www.zigbee.org.

An endpoint device of the ZigBee-based lighting system receives an RF communication from the coordinator, decodes a command in the communication, and in response to the command in the communication turns on or turns off the light of the light fixture. The system is "beacon enabled" in that the coordinator periodically transmits synchronizing frames referred to as beacons. The format of the beacons is defined by IEEE 802.15.4. The beacons are transmitted at widely spaced intervals, and between the times of the beacon transmissions the coordinator can spend much of its time in a low-power sleep mode. The endpoint devices receive the beacons and use the beacons to synchronize themselves to the beacon intervals such that the endpoint devices are in the low-power sleep mode at the same time that the coordinator is in the low-power sleep mode. The endpoints are able to wake-up and to enable their receivers synchronously with respect to the coordinator such that when the beacons are transmitted, the receivers of the endpoints are active. After receipt of a beacon, the endpoints turn off their RF transceivers and put themselves back into the low-power sleep mode of operation. It is the NWK layer of the ZigBee stack that manages this synchronization to beacons. Because the relative amount of time the coordinator and the endpoints are active and communicating is much smaller than the amount of time the coordinator and endpoints are in their sleep modes, overall power consumption of the devices is small. Although such a ZigBee-based lighting control system has many advantages, it has substantial disadvantages in some lighting control applications. These disadvantages include a large amount of protocol overhead, a high implementation cost, and quite surprisingly a high attendant power consumption.

SUMMARY

A low-power wireless time-hopping network involves a local master unit and a plurality of receiver units. In one example, the receiver units are RF-enabled fluorescent lamp starter units. Each starter unit can be commanded by the local master unit to turn on, or to turn off, a fluorescent lamp coupled to the starter unit.

In each of a plurality of intervals, a starter unit wakes up and listens for a beacon, regardless of whether a beacon is transmitted during that interval or not. The starter unit operates in a low power sleep mode during the majority of the interval. The local master unit can transmit a beacon during the beacon slot time of any interval, but typically only transmits a beacon frequently enough to maintain starter synchronization. If the local master unit wishes to communicate with the starter units with reduced latency, then the local master unit can transmit a beacon in the next interval. Starter units only transmit communications if first commanded to by a beacon. The beacon slot time is varied within the interval (for example, from interval to interval or from group of intervals to group of intervals) in a pseudo-random time-hopping fashion known both to the starter units and to the local master unit. This time-hopping reduces the persistence of possible collisions with similar networks.

In one example, there is an offset time between a point in an interval (for example, the beginning time of the interval) and the beacon slot time (for example, the beginning of the beacon slot time). To achieve time-hopping, the offset time is changed, either from interval to interval, or from group of intervals to group of intervals. Each unit in the system (the local master unit and the starter units) includes a table lookup function usable to determine the next offset time for the next interval. If the offset time is to be changed in accordance with the time-hopping protocol employed, then an index to the table lookup function is incremented (or it wraps). In response, the table lookup function outputs a value that determines the offset time used by the unit. Both the local master unit and the starter units use the same table lookup function, and index value, and therefore also use the same offset time during every interval. In some cases, the beacon includes a value (such as the index for the table lookup function) and this value is usable by the starter units to determine the proper offset time to be used next.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 2 is a diagram of a beacon used in the networks of FIG. 1.

FIG. 3 is table that describes the fields in the beacon of FIG. 2.

DETAILED DESCRIPTION

Reference will now be made in detail to background examples and some embodiments of the invention, examples of which are illustrated in the accompanying drawings.

Figure 1:
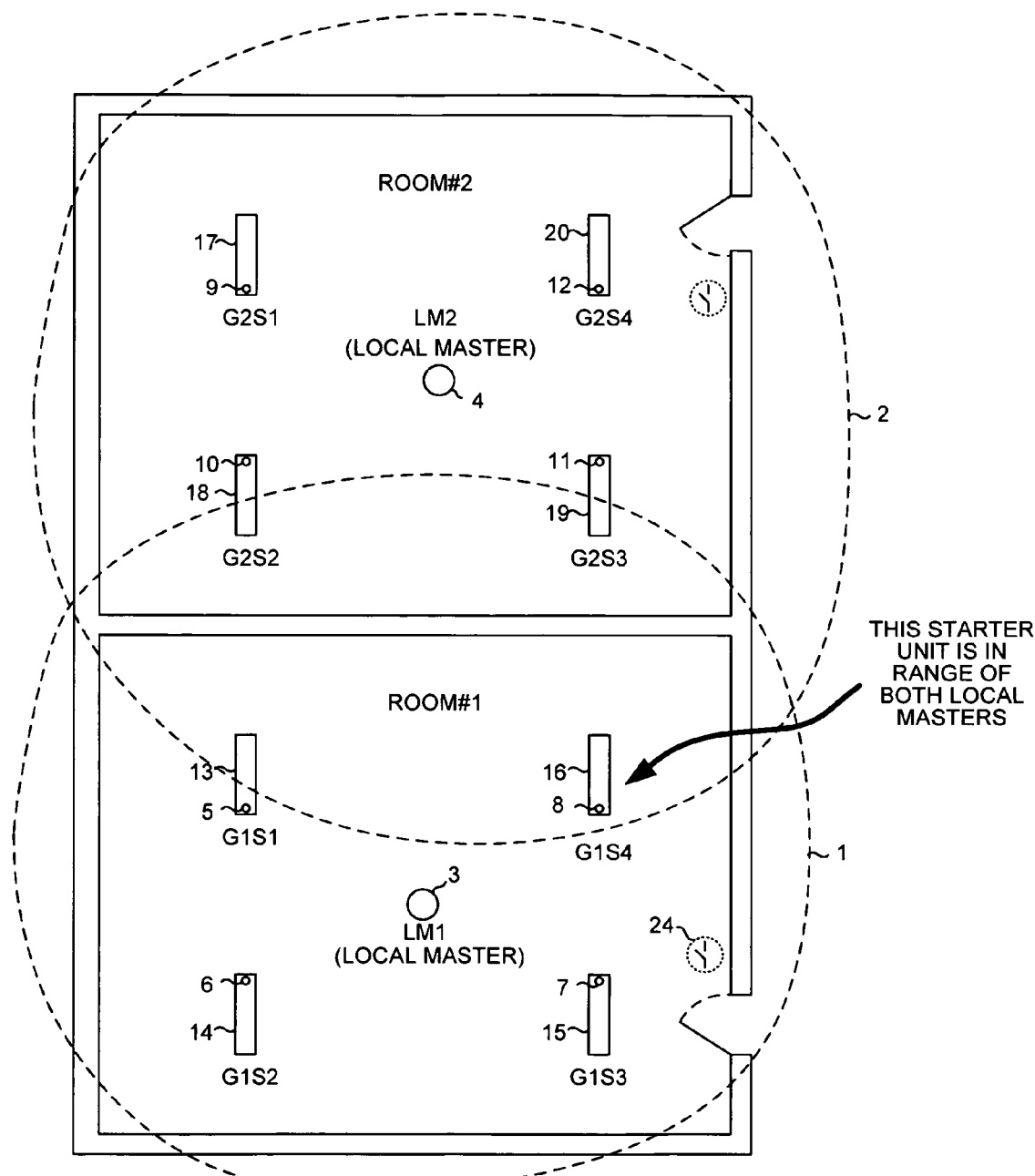
FIG. 1 is a diagram of two networks 1 and 2 that employ the same low-power time-hopping protocol in accordance with a novel aspect. Use of the time-hopping protocol reduces the persistence of collisions between the two networks.

FIG. 1 is a diagram of two networks 1 and 2. Each network is a time-hopping wireless network involving a local master unit that is in Radio Frequency (RF) wireless communication with a plurality of remote lighting control units. Network 1 involves local master unit (LM1) 3 and four lighting control units (G1S1, G1S2, G1S3, G1S4) 5-8. Similarly, network 2 involves local master unit (LM2) 4 and four lighting control units (G2S1, G2S2, G2S3, G2S4) 9-12. In the illustrated example, each of the lighting control units is an RF-enabled replaceable fluorescent lamp starter unit that is plugged into an accommodating socket fluorescent lamp light fixture such that the starter unit can be controlled by its local master to turn on a lamp of the fixture and to turn off the lamp of the fixture. Starter unit 5 is plugged into fixture 13; starter unit 6 is plugged into fixture 14; starter unit 7 is plugged into fixture 15; starter unit 8 is plugged into fixture 16; starter unit 9 is plugged into fixture 17; starter unit 10 is plugged into fixture 18; starter unit 11 is plugged into fixture 19; and starter unit 12 is plugged into fixture 20. The dashed line identified with reference numeral 1 indicates the approximate RF transmission range of local master unit LM1. The dashed line identified with reference numeral 2 indicates the approximately RF transmission range of local master unit LM2. The transmission ranges of the local master units as illustrated are just examples and in an actual implementation the ranges are affected by structures such as walls of a building housing the networks, and other components of the physical environment in which the networks operate. The particular dashed lines in FIG. 1 are drawn to show that the transmission ranges of the local master units of the two networks can overlap such that one or more lighting control units are in transmission range of multiple local master units. In the specific example described, lighting control unit G1S4 is to be controlled by local master unit LM1 without interference from local master unit LM2. The two networks are to be able to operate at the same time without one network adversely interfering with operation of the other network. Such a situation may, for example, exist where each network is to control the lights in a separate room of a building, such as in separate classrooms in a school.

Each of the local master units transmits RF communications referred to here as beacons. FIG. 2 is a diagram of one such beacon. FIG. 3 is a table that sets forth the various fields in the beacon of FIG. 2. The bits of the beacon are transmitted from left to right in FIG. 2 such that the bits of the start of frame (SOF) field are transmitted first and such that the bits of the end of frame (EOF) are transmitted last.

Figure 4:
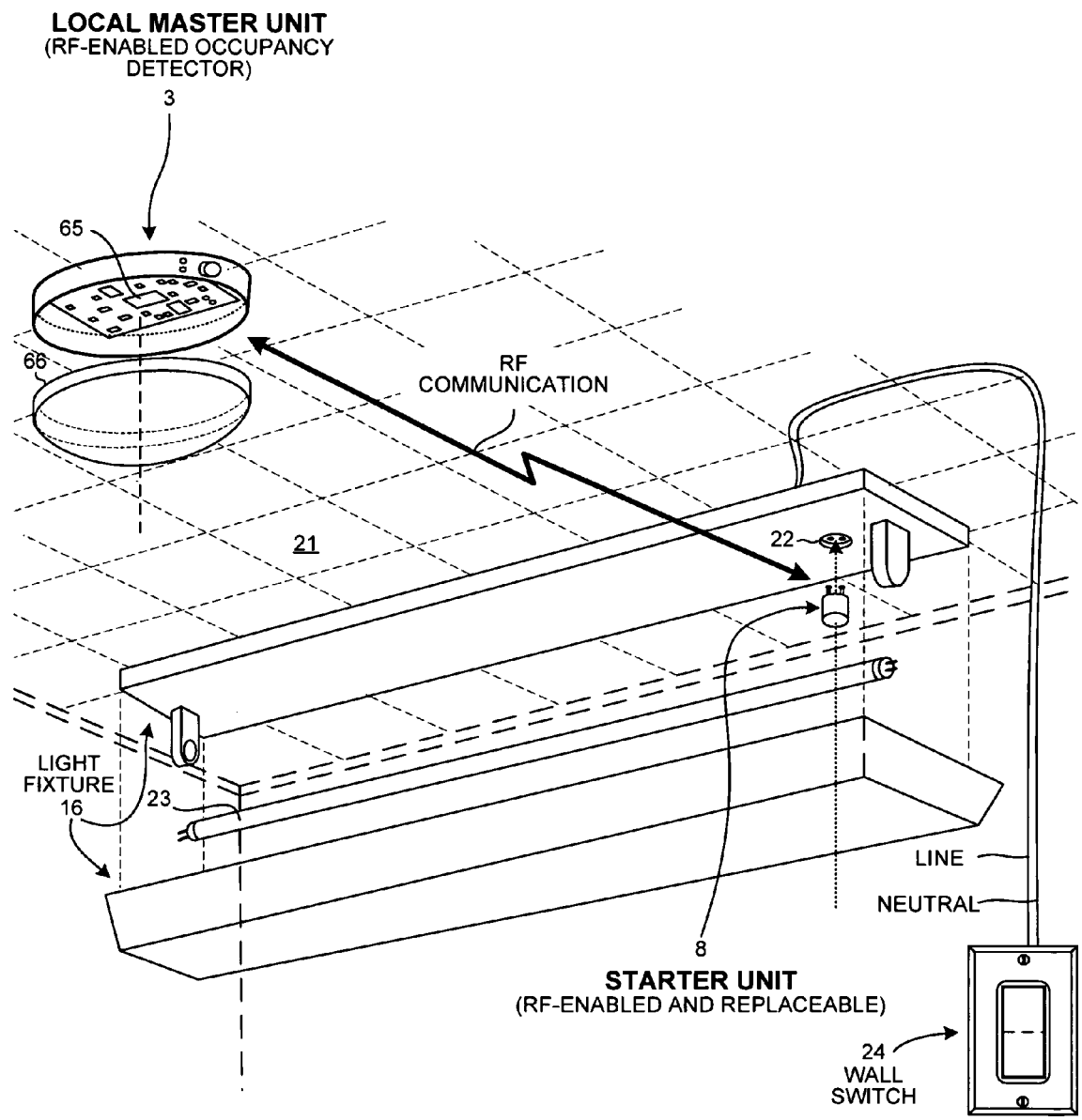
FIG. 4 is a perspective diagram of one of the local master units of network 1 of FIG. 1 and one of the replaceable RF-enabled starter units of network 1 of FIG. 1.

FIG. 4 is a perspective exploded view of local master unit 3 and starter unit (G1S4) 8. The local master unit 3 is a battery-powered PIR occupancy detector that is mounted to the ceiling 21 of the room (ROOM#1) illustrated in the bottom portion of FIG. 1. Starter unit 8 is plugged into an accommodating socket 22 of lighting fixture 16 as illustrated. Lamp 23 is the fluorescent lamp controlled by starter unit 8. If the wall switch 24 is in a first position, then fixture 16 is not energized by the line and neutral wires, and the electronics in the starter unit 8 is unpowered and does not operate. Lamp 23 is unpowered and is off. If the light wall switch 24 is in a second position, then fixture 16 is energized by the line and neutral wires. Electronics in starter unit 8 is powered. Starter unit 8 in this condition may be controlled to turn lamp 23 on or off. In normal operation of the network 1, wall switch 24 is left in this position so that the starter units can turn off the fluorescent lamps in the room when appropriate to save electrical energy.

Figure 5:
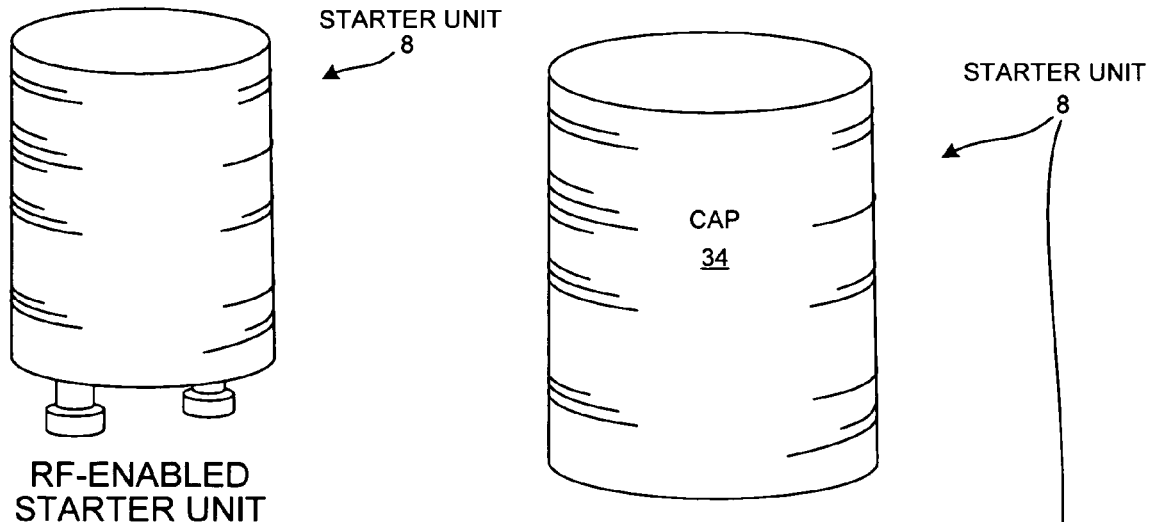
FIG. 5 is a perspective diagram of one of the RF-enabled starter units of network 1 of FIG. 1.

FIG. 5 is a perspective view of starter unit 8.

Figure 6:
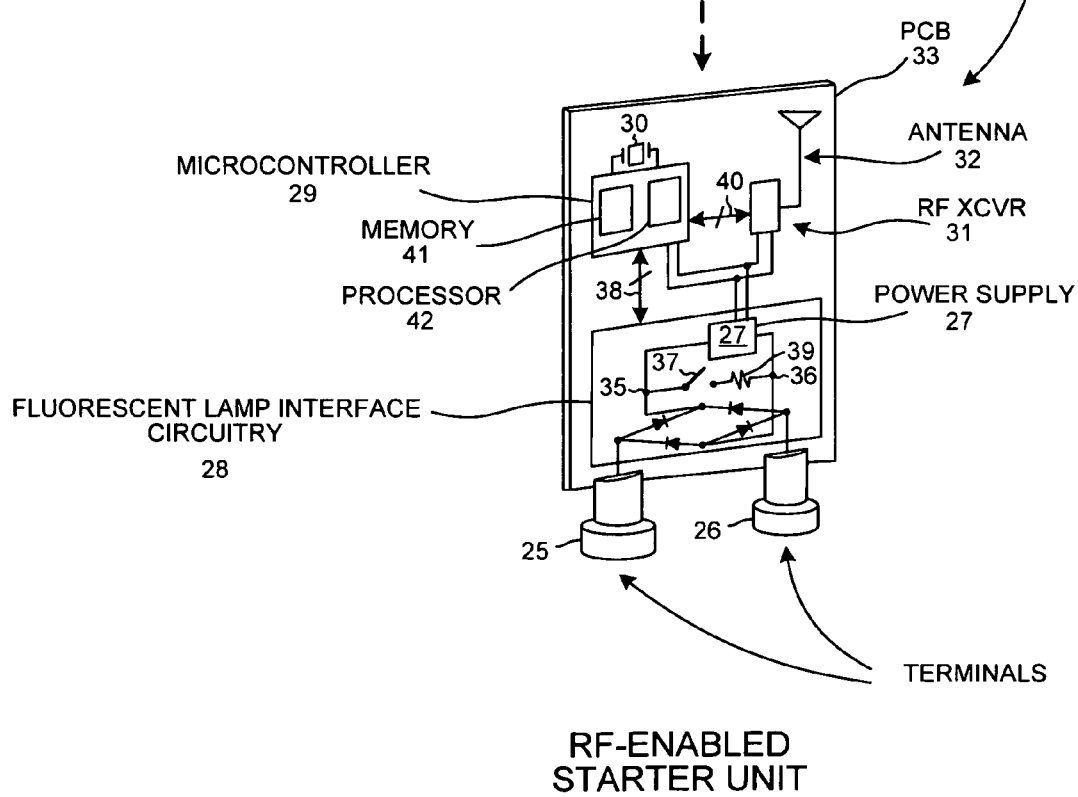
FIG. 6 is an exploded view of the RF-enabled starter unit of FIG. 5.

FIG. 6 is an exploded perspective view of starter unit 8. Starter unit 8 includes a first terminal 25, a second terminal 26, a power supply circuit 27, fluorescent lamp interface circuitry 28, a microcontroller integrated circuit 29, a 32.768 kHz crystal 30, an RF transceiver integrated circuit 31, and an antenna 32. This circuitry is disposed on a printed circuit board (PCB) 33 as illustrated. PCB 33 is disposed within a cylindrical cap 34. Terminals 25 and 26 extend downward through holes in a circular disk-shaped base portion (not shown) of PCB material. The circular edge of this disk-shaped base portion joins with the circular bottom edge of cap 34 and forms a circular bottom of starter unit 8.

Fluorescent lamp interface circuitry 28 includes a full wave rectifier that receives a 230 VAC signal between terminals 25 and 26 and outputs a full wave rectified signal between nodes 35 and 36. Power supply circuit 27 receives the full wave rectified signal between nodes 35 and 36 and generates therefrom a direct current (DC) supply voltage VDD used to power microcontroller 29, RF transceiver 31, and interface circuitry 28. Power switch 37 is a switch that is used to turn on, and to turn off, fluorescent lamp 23. Power switch 37 is a power Field Effect Transistor (FET) that is controlled by microcontroller 29 via gate drive circuitry of circuitry 28. Microcontroller 29 drives the gate of switch 37 and controls and monitors the remainder of interface circuitry 28 via signals communicated across conductors 38. Microcontroller 29 monitors and traces the AC voltage waveform between nodes 35 and 36 using an Analog-to-Digital Converter (ADC) that is part of the microcontroller. Microcontroller 29 monitors and traces the waveform of the current flowing through switch 37 by using its ADC to monitor a voltage dropped across a sense resistor 39. Microcontroller 29 uses an on-board comparator and timer to detect and time zero-crossings of the AC signal on terminals 25 and 26. Microcontroller 29 determines when and how to control switch 37 based on the detected AC voltage between nodes 35 and 36, the time of the zero-crossings of the AC signal on terminals 25 and 26, and the magnitude of current flow through switch 37.

Crystal 30 is a 30 ppm (parts per million) accuracy 32.768 kHz crystal that is used to generate an accurate time base for the timer within microcontroller 29. This timer is used not only to monitor the AC voltage waveform on nodes 35 and 36, but it is also used to control and to time other starter unit operations such as the timing of when beacons are transmitted, the timing of when the RF transceiver is placed into the receive mode, and the timing of when the starter unit circuitry is placed into a low-power sleep mode. Execution of instructions by the microcontroller, on the other hand, is clocked by a relatively less accurate 1.3824 MHz clock signal generated by a four percent accuracy Internal Precision Oscillator (IPO) that is internal to the microcontroller integrated circuit.

Microcontroller 29 communicates with and controls RF transceiver 31 via a bidirectional serial SPI bus and serial bus conductors 40. In one embodiment, microcontroller 29 is a Z8F2480 8-bit microcontroller integrated circuit available from Zilog, Inc., 6800 Santa Teresa Blvd., San Jose, Calif. 95119. Microcontroller 29 includes an amount of non-volatile memory (FLASH memory) 41 that can be written to and read from by processor 42 under software control during operation of starter unit 8. Flash memory 41 stores program code executed by processor 42 to implement the time-hopping protocol used, as well as to store parameters and configuration information specific to starter unit 8. In one embodiment, RF transceiver 31 is a SX1211 transceiver integrated circuit available from Semtech Corporation, 200 Flynn Road, Camarillo, Calif. 93012. Transceiver 31 in sleep mode consumes about 2 uA of supply current, whereas transceiver 31 in receive mode consumes about 3.5 mA of supply current and in transmit mode consumes about 25 mA of supply current. Transceiver 31 is coupled to antenna 32 via an impedance matching network (not shown) and a SAW filter (not shown). The SAW filter may, for example, be a B3716 SAW filter available from the Surface Acoustic Wave Components Division of EPCOS AG, P.O. Box 801709, 81617 Munich, Germany. Antenna 32 may, for example, be a fifty ohm 0868AT43A0020 antenna available from Johanson Technology, Inc., 4001 Calle Tecate, Camarillo, Calif. 93012. The RF transceiver operates in a license free frequency band in the 863-878 MHz range (for example, about 868 MHz), in accordance with a reference design available from Semtech Corporation. Microcontroller 29 controls transceiver 31 with minimal power consumption by issuing commands to the transceiver via serial bus 40, setting a timer to wake itself at a proper future time, and then putting itself into a low power mode. In the low power mode the microcontroller consumes approximately 25 microamperes (uA) of supply current whereas the microcontroller consumes approximately 1.4 milliamperes (mA) of supply current when fully active.

Local master unit 3 (see FIG. 4) includes a battery-powered infrared occupancy detector that involves a Passive InfraRed (PIR) sensor 65 and a multi-section fresnel lens 66. Using techniques well known in the art, the infrared occupancy detector detects motion of an infrared emitter (for example, a person) in the field of view of the fresnel lens and detects the lack of motion of such infrared emitters. In addition to this motion detecting circuitry, local master unit 3 also includes a microcontroller and transceiver and antenna circuit that is the same as the microcontroller 29, transceiver 31, and antenna 32 of starter unit 8. Local master unit 3 can use its RF transceiver circuitry to receive communications from and to transmit communications to the RF transceiver circuits of starter units. The microcontroller and transceiver circuitry in each of the units 3, 5-8 of network 1 is operable in a lower power sleep mode, and is also operable in a higher power transmit mode, and is also operable in a higher power receive mode. All communications occur over the same 868 MHz frequency band. Both of networks 1 and 2 of FIG. 1 are identical in this example so operation of only one of the networks, network 1, is described below. It is to be understood that network 2 is of identical construction and operation to network 1.

Communication between the units 3, 5-8 of network 1 is synchronous with respect to a stream of adjacent 800 millisecond (ms) intervals of time. Each 800 ms interval has a 5 ms beacon slot time in which the local master unit can transmit a beacon. In the system of FIG. 1, local master LM1 usually only transmits one beacon in each 256th interval. A beacon is therefore transmitted once each 3.41 minutes. Although 5 ms is reserved for these beacon slot times, the time required to transmit a beacon at a data rate of 50 kbps is approximately 2.7 ms. Starter units 5-8 do not transmit unless specifically instructed to by a beacon received from local master LM1. Starter units 5-8 use the beacons to synchronize when they wake up their RF transceivers and place the RF transceivers into receive mode. The synchronization occurs such that the RF transceivers of the starter units 5-8 are in the receive mode during the beacon slot times so that if the local master unit LM1 were to transmit a beacon during a beacon slot time of an 800 ms interval, the starter units would receive the beacon. The starter units wake up and listen for a beacon during the beacon slot time of each 800 ms interval, regardless of whether the local master unit LM1 transmits a beacon during that interval or not.

As illustrated in FIG. 2, each beacon includes, among other fields shown, an eight-bit command field CMD, a sixteen-bit source address field SRC, and a sixteen-bit command target address field CTA. If the command field includes an information request command value of 00000100, then the starter unit identified by the value in the CTA field is commanded to transmit information back to the local master unit. The local master unit that issued the information request beacon switches its RF transceiver from the transmit mode to the receive mode such that after transmission of the beacon the local master unit can receive the return communication from the addressed starter unit. After receiving the beacon with the command, the addressed starter unit switches its RF transceiver from the receive mode to the transmit mode and transmits the return communication back to the local master unit LM1 during a 5 ms period that starts at the end of the beacon slot time. Because each starter unit has a different target address, the local master unit 3 can cause only a selected one of the starter units 5-8 to transmit information back at a time. The amount of time each 800 ms interval that the local master and the starter units communicate with one another each interval is very small compared with the overall 800 ms duration of the interval.

Figure 7:
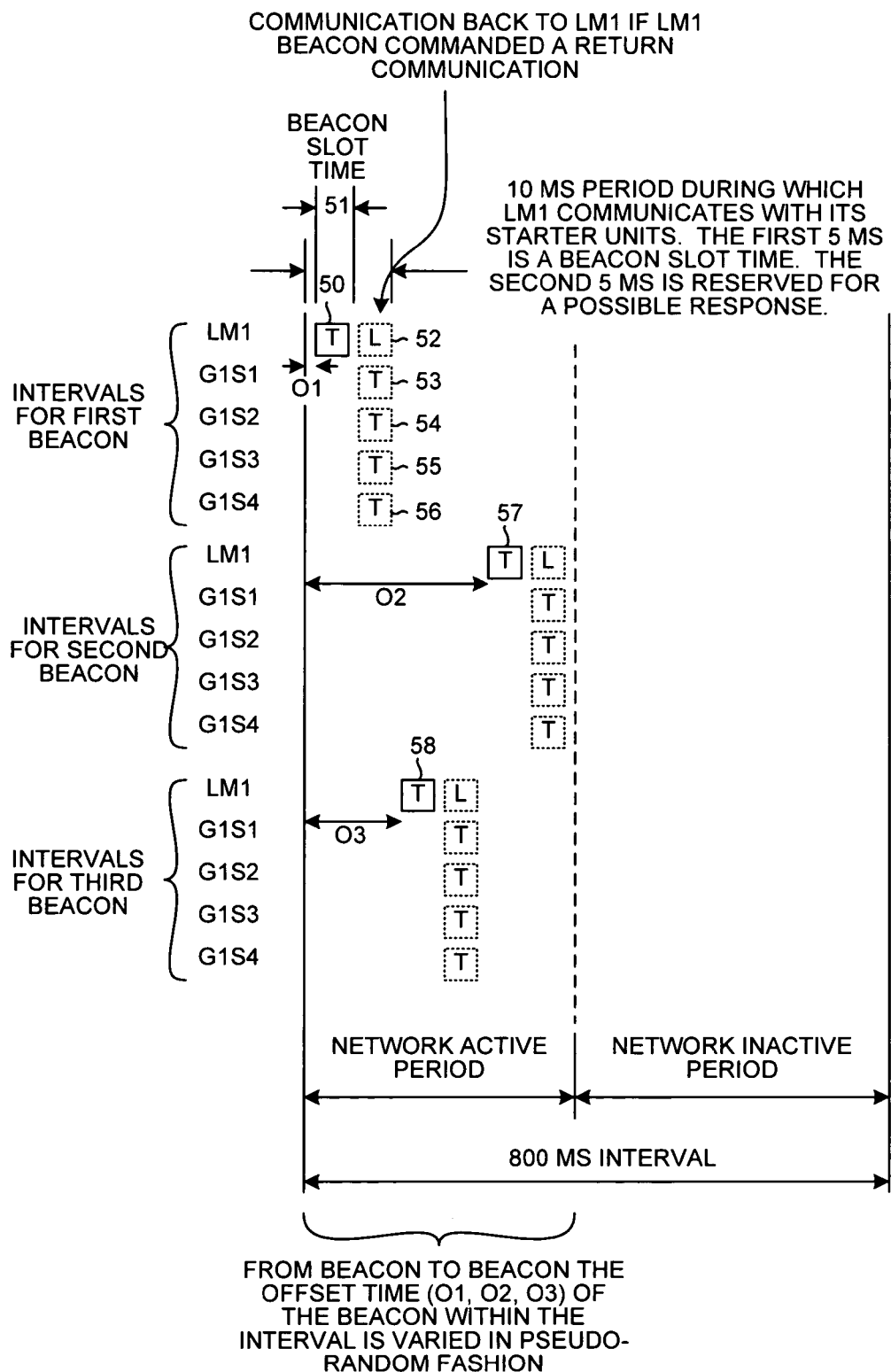
FIG. 7 is a diagram that shows how and when the units of network 1 of FIG. 1 communicate in one 800 ms interval in normal mode.

FIG. 7 is a diagram that illustrates operation of network 1 in accordance with a first embodiment in a normal operation mode. All the starter units 5-8 are synchronized with respect to the beacons transmitted by the local master unit LM1. Due to the synchronization, each starter unit wakes up from its low power sleep mode at the right time to place its receiver into receive mode so that its receiver will be operational and "listening" during the beacon slot time of the interval. If the starter unit receives such a beacon, and if the beacon contains a command that the addressed starter unit is to transmit back to the local master unit LM1, then the addressed starter unit transmits back as commanded during the next 5 ms following the beacon slot time. If, however, the beacon contains no such command, then the starter unit returns to sleep mode to conserve power. Reference numeral 50 in FIG. 7 identifies the transmission ("T") of a first beacon in beacon slot time 51. Time, in the diagram of FIG. 7, extends from left to right. The row labeled LM1 indicates operation of local master LM1. The row labeled G1S1 indicates operation of starter unit G1G1, and so forth. Reference numeral 52 identifies a time when the local master unit LM1 is listening ("L") for a response from an addressed starter unit. The dashed boxes 53-56 labeled "T" indicate that one of the starter units (the one addressed by the beacon) will be transmitting back to the local master unit LM1 at this time. Regardless of whether a starter unit transmits back or not, the starter unit operates in low power sleep mode when it is not listening for a beacon and is not transmitting as commanded by a beacon. The period in which all starter units 5-8 are in sleep mode is indicated in FIG. 7 as the network inactive period.

In one novel aspect, the protocol involves moving the beacon slot time in time in pseudo-random fashion within the 800 ms intervals so that the duration during which collisions with beacons from network 2 might occur will be reduced. In the example of FIG. 7, there is an "offset time" from the start of each interval to the beginning of the beacon slot time. A first beacon 50 is transmitted such that this offset time O1 has a first value. The starter units are aware of the offset time O1. The starter units make use of this information to wake up and listen for the first beacon 50 every 800 ms interval during the beacon slot times of those intervals. Because the local master unit LM1 3 does not transmit a beacon every 800 ms interval, the starter units 3-8 wake up and listen for the beacon every interval at the appropriate time as indicated by the offset time. In the diagram of FIG. 7, the first beacon 50 is transmitted starting at this first offset time O1.

In the example of FIG. 7, once the first beacon 50 has been received by the starter unit, then both the local master unit LM1 and the starter units switch to using a second offset time O2. This second offset time O2 is then used by the starter units to wake up at the appropriate times to listen for the second beacon. Reference numeral 57 identifies the second beacon. The local master unit LM1 uses the second offset time O2 to determine when the beacon slot time occurs within the interval, and to transmit the second beacon at the correct time. Note that in the diagram of FIG. 1, the first offset time O1 was small and the first beacon 50 was transmitted close to the beginning of an 800 ms interval. Note, however, that the second offset time O2 was larger and the second beacon 57 was transmitted closer to the end of the network active period of an 800 ms interval.

Again, once the second beacon 57 has been received by the starter units, both the local master unit and the starter units switch to using a third offset time O3. This third offset time O3 is then used by the starter units to wake up at the appropriate times to listen for the third beacon 58. The changing of the offset time upon transmission of each beacon continues indefinitely as long as the starter units remain in synchronization. With the transmission of each beacon, note that the beacon slot time moves with respect to the start of the 800 ms interval. The local master unit does not transmit a beacon each interval, but the starter units wake up each 800 ms interval using the same proper offset time until the next beacon is received. Once the beacon is received, the offset time is changed, and the process repeats.

In normal mode, the local master unit monitors that its starter units are in synchronization and are receiving beacons. The local master unit does this by sending its starter units commands to respond and to report back that they are properly synchronized. Each beacon includes a command that one particular starter unit report back that it is properly synchronized, and this checking on the synchronization status of the starter units occurs in round-robin fashion from starter unit to starter unit of the network.

In one example, the local master unit stores a table of values, and these values are usable to change the offset time from one value to the next. Each value as output from the table results in a different offset time being used. As each successive beacon is transmitted, an index value to the table is incremented and wraps such that the offset time changes from beacon to beacon. The sequence of offset times as stored in the table is generated using a pseudo-random number generator such that the offset times change in pseudo-random fashion and such that the corresponding time-positions of the beacon slot times within their respective intervals also vary in pseudo-random fashion.

Each starter unit also stores a table that is identical to the table stored in the local master unit. In the same way that the local master indexes its table to determine the correct offset time, so too do the starter units index their tables to determine the correct offset time. To help keep the indexing of these tables the same in the local master unit and in the starter units, the local master unit transmits a value as part of each beacon. The value is an index to the table in the starter unit for the next beacon to be transmitted. The starter unit receives the beacon, and uses the value to index its table, thereby using an offset time that is the same as the offset time that will be used by the local master unit for transmission of the next beacon. Including this table index value in the beacon allows a starter unit to fail to receive a beacon without becoming desynchronized. If the starter unit receives a beacon, then it can use the table index value in the beacon to find where in the sequence of table values the network is and can determine the next offset time so it can receive the next beacon.

Figure 8:
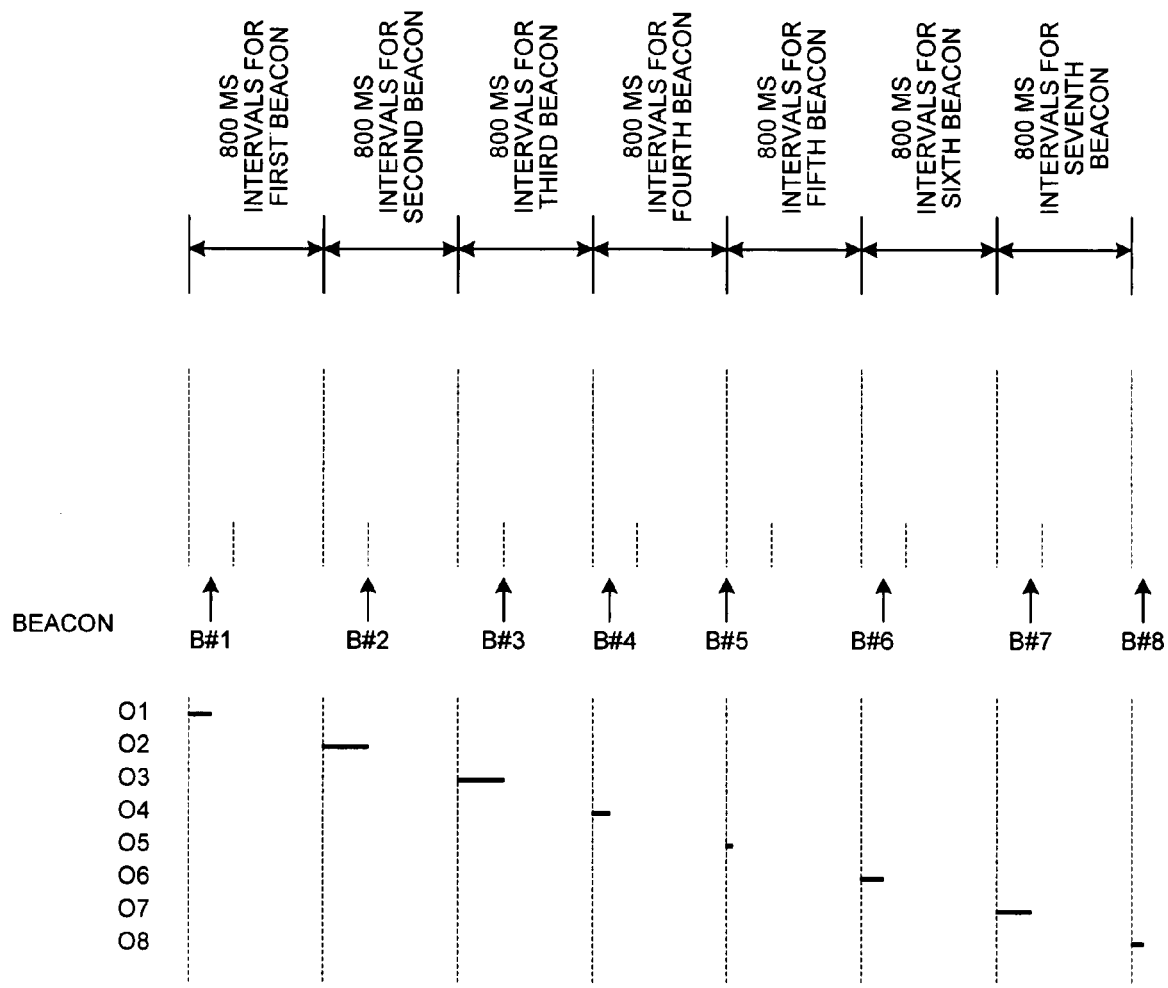
FIG. 8 is a diagram that shows how the offset time (from the beginning of the interval to the beginning of the beacon) is varied from beacon to beacon in accordance with a first embodiment, when network 1 is operating in the normal mode.

FIG. 8 is another diagram that illustrates how the offset time, and the associated beacon slot time, changes from beacon to beacon. A sequence of eight beacons, B#1-B#8, is illustrated in FIG. 8. Offset time O1 is used for intervals up until the transmission of first beacon B#1. Then, offset time O2 is used for the next intervals up unit the transmission of the second beacon B#2, and so on. The number of 800 ms intervals that employ a given offset time until the next beacon is transmitted is, in this embodiment, generally 256 intervals. If, however, the local master unit LM1 needs to inform its starter units of a condition with less latency (for example, due to detecting a motion condition the local master unit wants to command its starter units to turn on their lights), then the local master unit can transmit a beacon in the very next 800 ms interval after making the decision to inform the starter units. The starter units listen each 800 ms interval regardless of whether a beacon is present or not, so the starter units will receive the beacon transmitted in the next interval.

Figure 9:
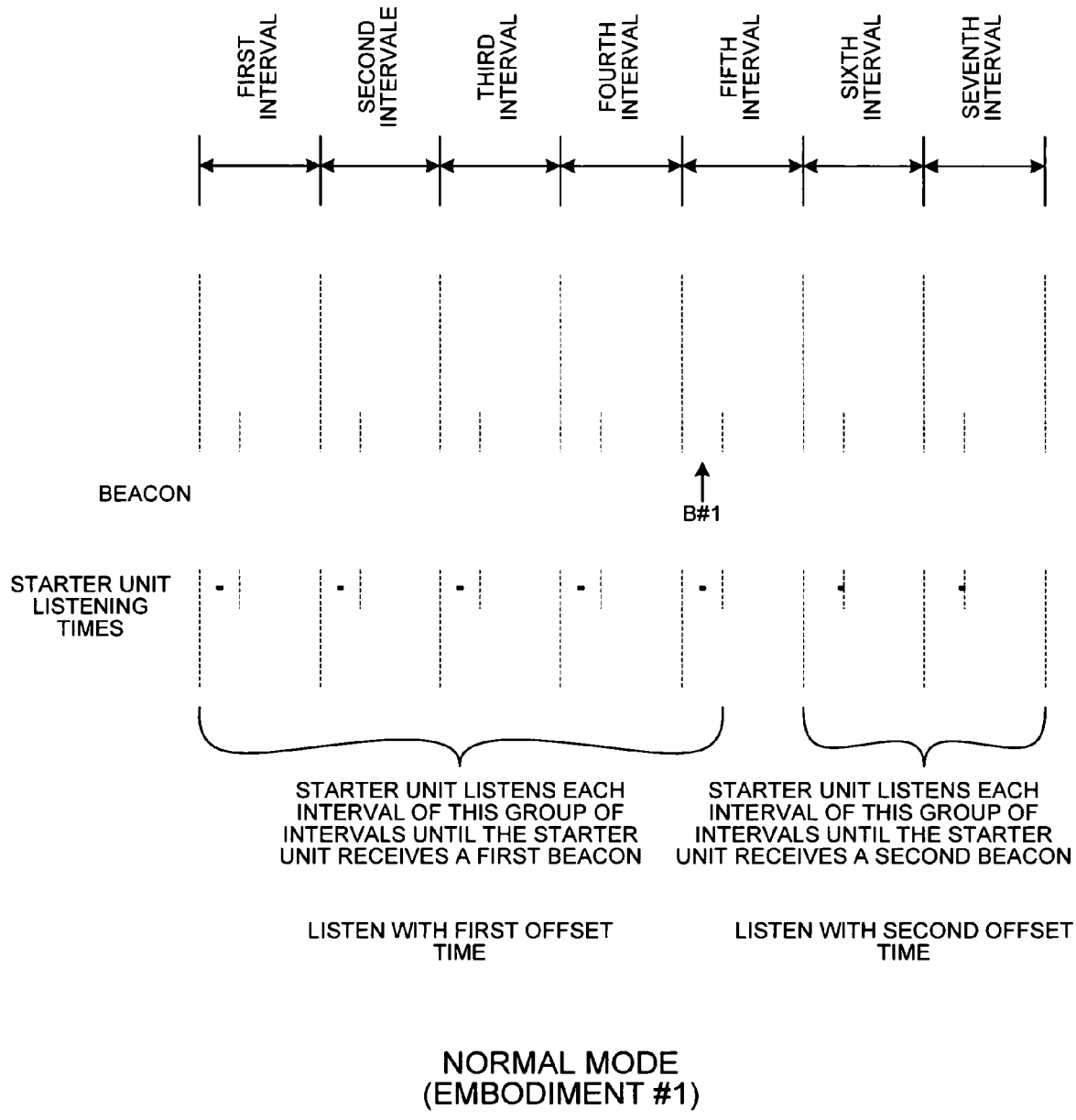
FIG. 9 is another diagram of the normal mode operation of FIG. 8.

FIG. 9 is another diagram that illustrates how, in the first embodiment, the beacon slot time does not change until a new beacon is to be transmitted. In the example of FIG. 9, the same offset time O1 and beacon slot time is used for the first through fifth intervals. The first beacon B#1 is transmitted in the fifth interval as illustrated. The local master unit and the starter units switch to using the second offset time O2 and beacon slot time starting in the sixth interval.

Figure 10:
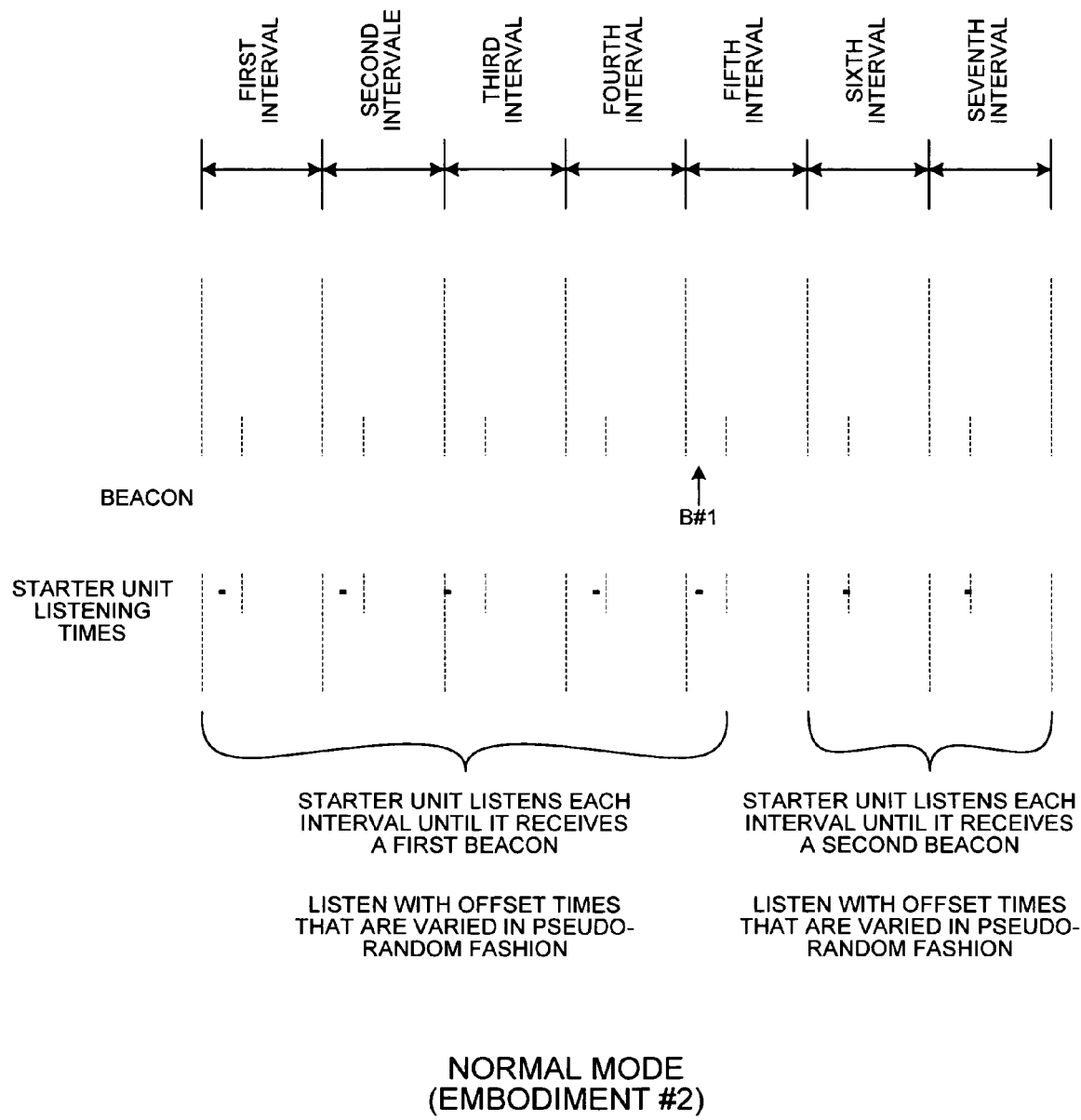
FIG. 10 is a diagram that shows how the offset time (from the beginning of the interval to the beginning of the beacon) is varied from interval to interval in accordance with a second embodiment, when network 1 is operating in the normal mode.

FIG. 10 is a diagram that that illustrates operation of network 1 in accordance with a second embodiment in the normal operation mode. In the second embodiment, the local master unit and the starter units switch offset times and beacon slot times each 800 ms interval, regardless of whether a beacon is transmitted during that 800 ms interval or not. Note that in the diagram of FIG. 10, the listening times of the starter units move around in time (with respect to the 800 ms interval time period) in the first through fifth intervals even though the only beacon transmitted during these intervals is beacon B#1 that is transmitted in fifth interval. As in the first embodiment described above, each beacon includes a table index value that is usable by the starter units as an index to determine the next offset time to be used. From interval to interval between beacons, however, the starter units increment through their lookup tables to determine the offset times.

Figure 11:
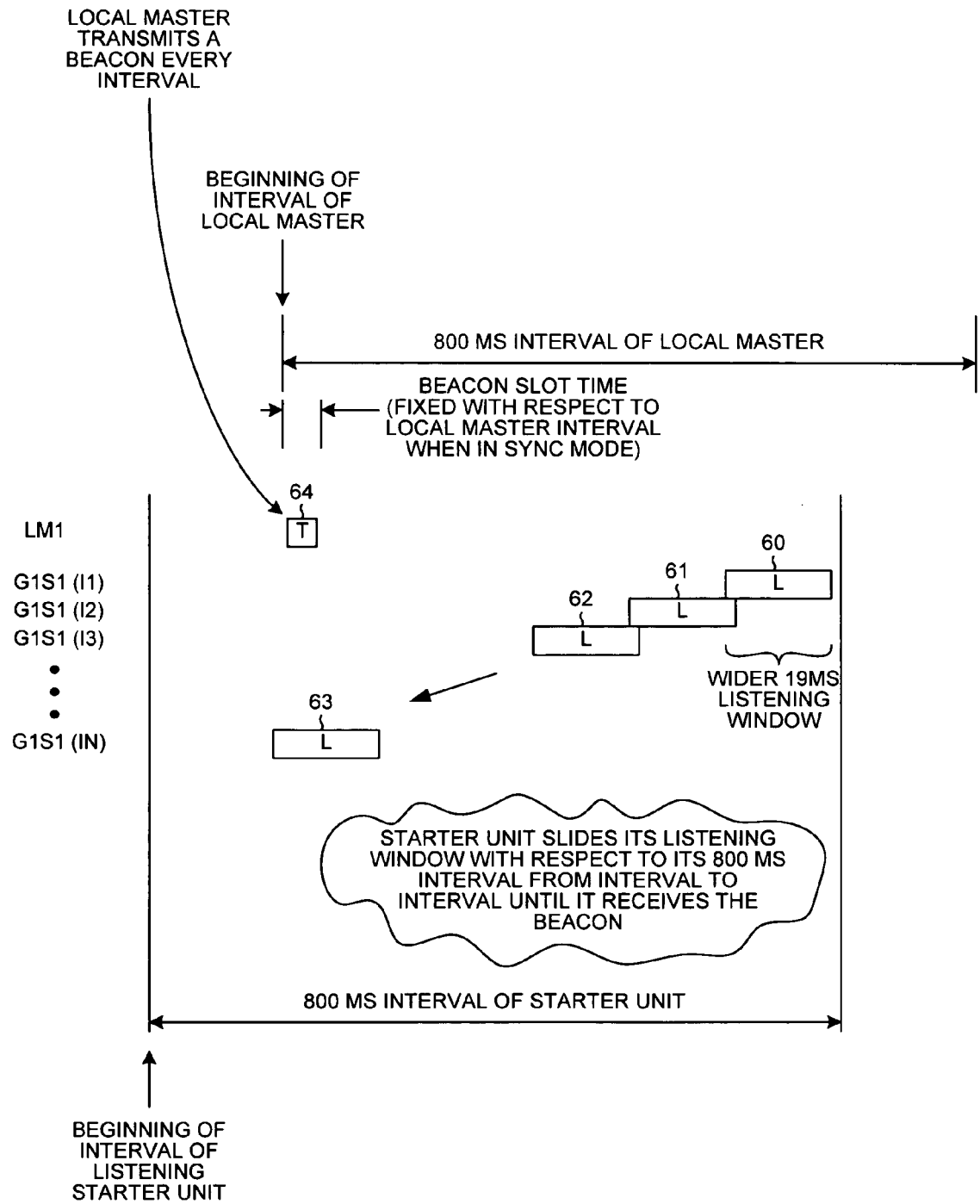
FIG. 11 is a diagram of operation of network 1 of FIG. 1 in synchronization mode, wherein a sliding listening window technique is used in a plurality of intervals to detect a beacon.

FIG. 11 is a diagram that illustrates operation of network 1 in synchronization mode. In some embodiments, if a starter unit fails to report back that it is properly synchronized, then the local master unit can determine that all starter units are to be resynchronized. The local master unit transmits a beacon having a broadcast address that addresses all listening starter units of the network. The remaining starter units that were synchronized therefore receive this broadcast beacon. The command of the broadcast beacon commands the starter units to go into a synchronization mode. The local master unit then too goes into the synchronization mode. Any starter unit that fails to receive a beacon within a predetermined amount of time determines that it is out of synchronization, and also places itself into the synchronization mode. In this example, the starter unit that failed to report does not receive beacons for more than a certain amount of time and therefore places itself into synchronization mode. In synchronization mode, the varying of the offset time of the normal mode is not performed, but rather the beacon slot times of all intervals are at the same location with respect to the start and end of the intervals. Moreover, a beacon is transmitted each 800 ms interval rather than once every 256 intervals. During each 800 ms interval, each starter unit enables its receiver and listens for a beacon for a wider 19 ms listening window. The locations of these 19 ms listening window are moved across the 800 ms interval time used by the starter unit, interval to interval, as illustrated in FIG. 11. The I1, I2, I3 to IN notation in FIG. 11 indicate a sequence of intervals. In FIG. 11, listening window 60 is used first in interval I1, then listening window 61 is used in interval I2, and so forth until listening window 63 overlaps a beacon 64 in interval IN. Within the starter unit is a timer that is clocked by a signal generated from crystal 30. The starter unit uses this timer to determine the beginning and ending of the 800 ms intervals. When beacon 64 is received, the starter unit sets this timer to an appropriate value such that the interval used by the starter unit is now synchronized to the interval used by the local master unit. The local master unit one by one addresses the starter units and commands them to respond with their synchronization status. One by one the starter units register their being synchronized with the local master unit. When all starter units report that they are synchronized, then the local master unit transmits a second broadcast beacon. This second broadcast beacon includes a command to all starter units to return to normal mode operation.

Figure 12:
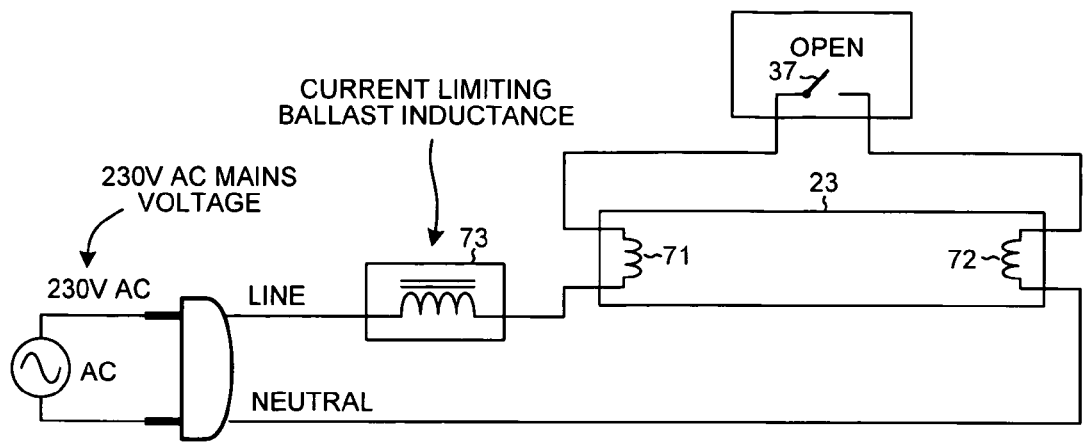
FIGS. 12-15 are diagrams that illustrate how one of the starter units of network 1 of FIG. 1 can turn on a fluorescent lamp.

Lamp Ignition and Turn Off:

FIGS. 12-15 illustrate how a starter unit can turn on a fluorescent lamp. FIG. 12 shows an initial condition in which lamp 23 is off. Switch 37 is open, and no current flows through the lamp.

Figure 13:
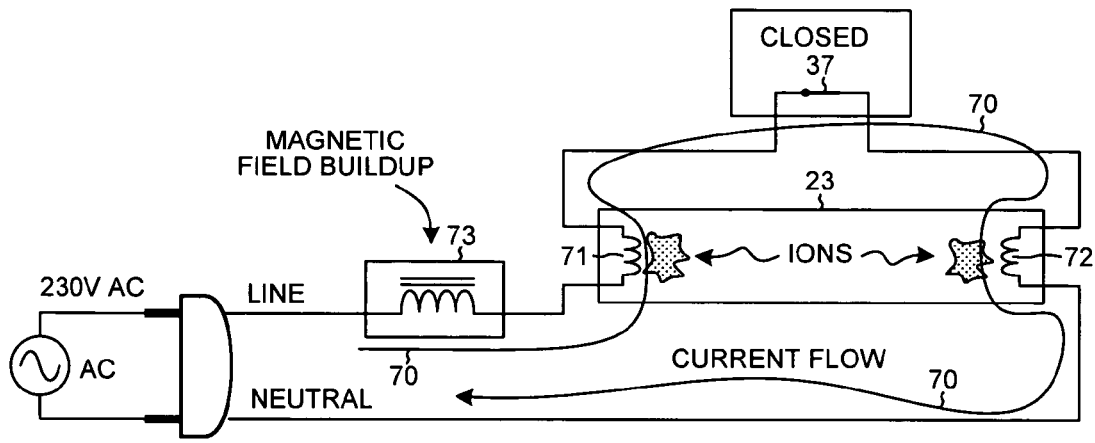

FIG. 13 shows a first step in the process of turning on lamp 23. Switch 37 is closed, thereby causing current flow 70. The filaments 71 and 72 heat, and a magnetic field builds in a ballast inductance 73.

Figure 14:
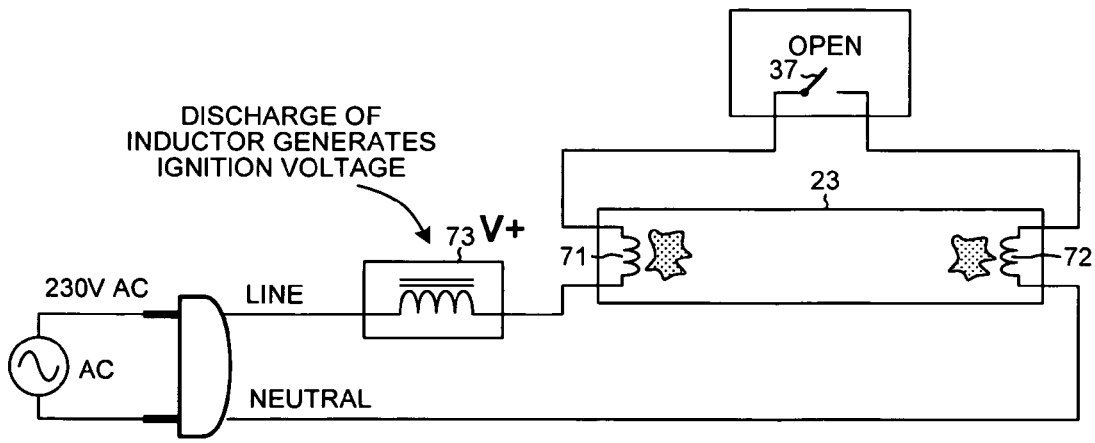

FIG. 14 shows a second step in the process of turning on the lamp. Switch 37 is opened. The collapsing magnetic field in inductance 73 causes a large voltage to develop across the inductance 73 and between the filaments 71 and 72.

Figure 15:
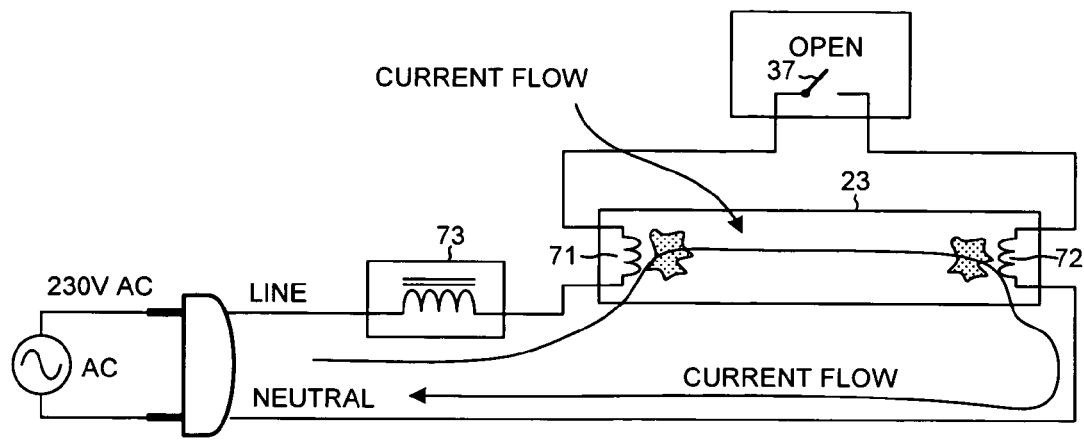

FIG. 15 shows a third step in the process of turning on the lamp. The large voltage developed across the inductance 73 is present between the filaments 71 and 72 of the lamp. This voltage causes an arc to form through gas within the lamp. Once the arc forms, the resistance between the two filaments drops, and continued current flow is possible. The continued AC current flow continues to keep the filaments hot such that the arc is maintained and current flow continues. The fluorescent lamp is then on and switch 37 remains open.

Figure 16:
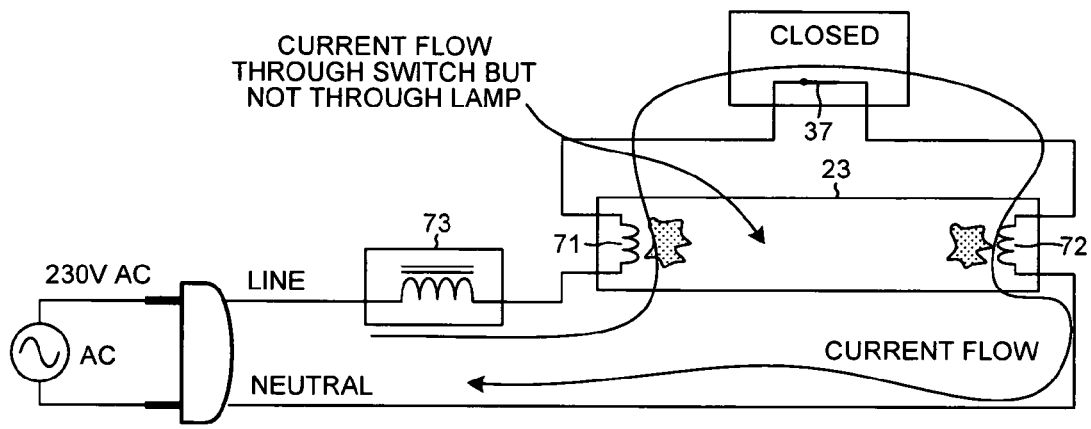
FIGS. 16-19 are diagrams that illustrate how one of the starter units of network 1 of FIG. 1 can turn off a fluorescent lamp.

FIGS. 16-19 illustrate how a starter unit can turn off a fluorescent lamp. Initially, fluorescent lamp 23 is on and the circuit is in the on state illustrated in FIG. 15. Next, switch 37 is closed as illustrated in FIG. 16. Due to switch 37 being closed, current stops flowing through lamp 23 but rather flows through closed switch 37. The arc through the lamp is stopped. Current, however, continues to flow through filaments 71 and 72 and the filaments continue to be heated. Switch 37 can only remain closed in this condition for a short amount of time as explained above or the switch will become overheated and will be destroyed.

Figure 17:
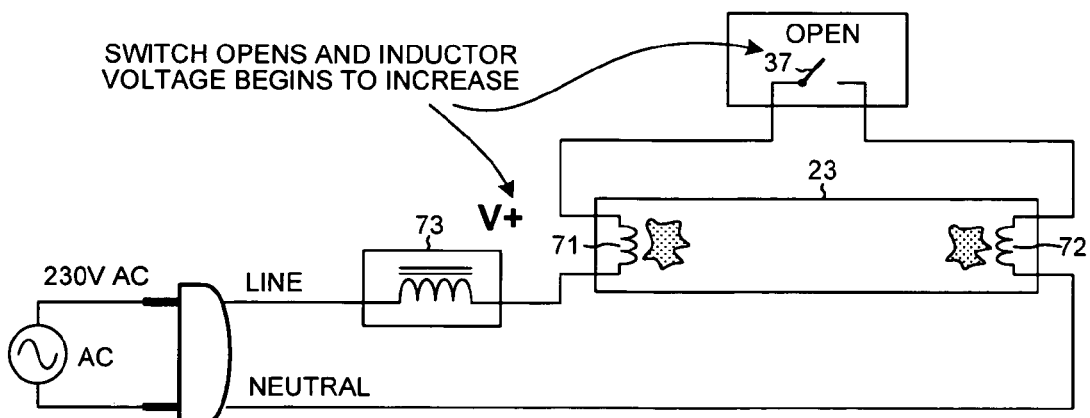
Figure 18:
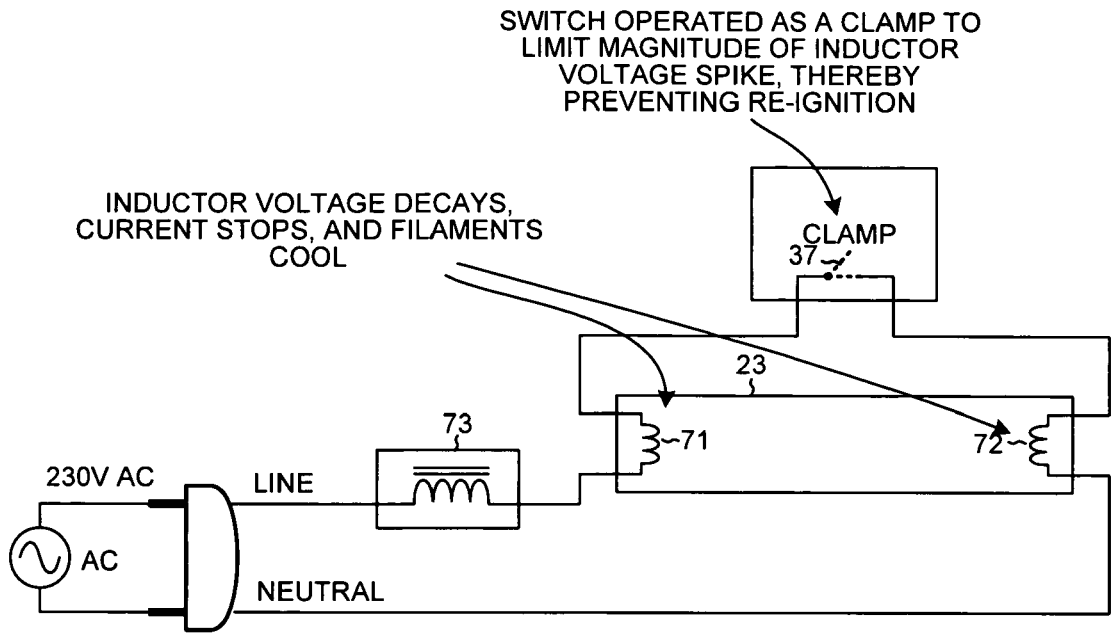
Figure 19:
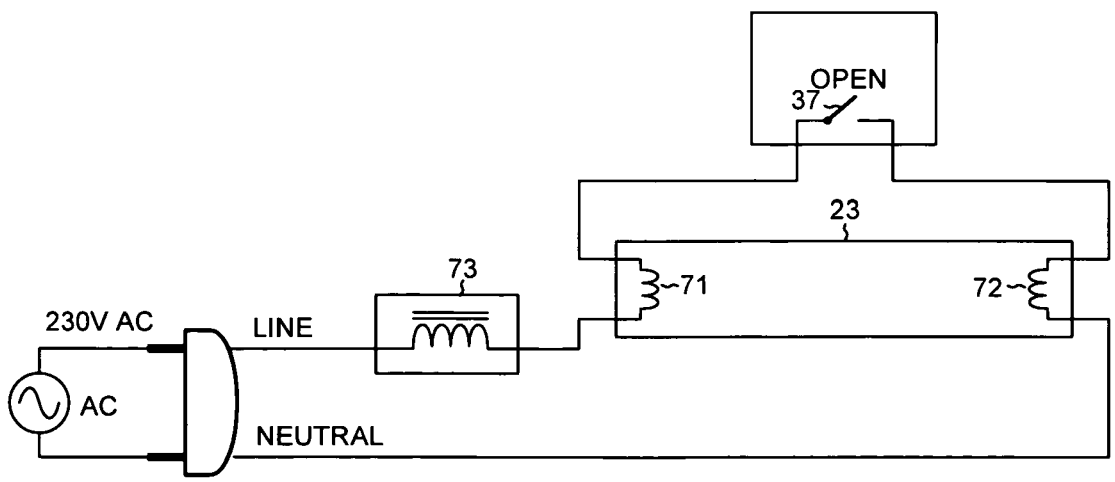

Next, as illustrated in FIG. 17, switch 37 is opened. The cutting of current flow through inductance 73 causes a voltage to start to develop across inductance 73, but before the voltage can increase to the point that an arc is ignited through lamp 23, switch 37 is made to operate as a voltage clamp to limit the magnitude of the voltage spike. Clamp operation of switch 37 is represented in FIG. 18 by showing switch 37 in dashed lines. Due to the clamping action of switch 37, the voltage across inductance 73 is not high enough to ignite an arc through lamp 23, and energy stored in a magnetic field in inductance 73 is dissipated. After enough of the energy stored in inductance 73 has been dissipated and after filaments 71 and 72 have stopped ionizing gas to an adequate degree, then switch 37 is opened on a constant basis without igniting an arc. This condition is illustrated in FIG. 19. There is no current flow, and the filaments 71 and 72 begin to cool. The fluorescent lamp is then said to be in the off condition.

Figure 20:
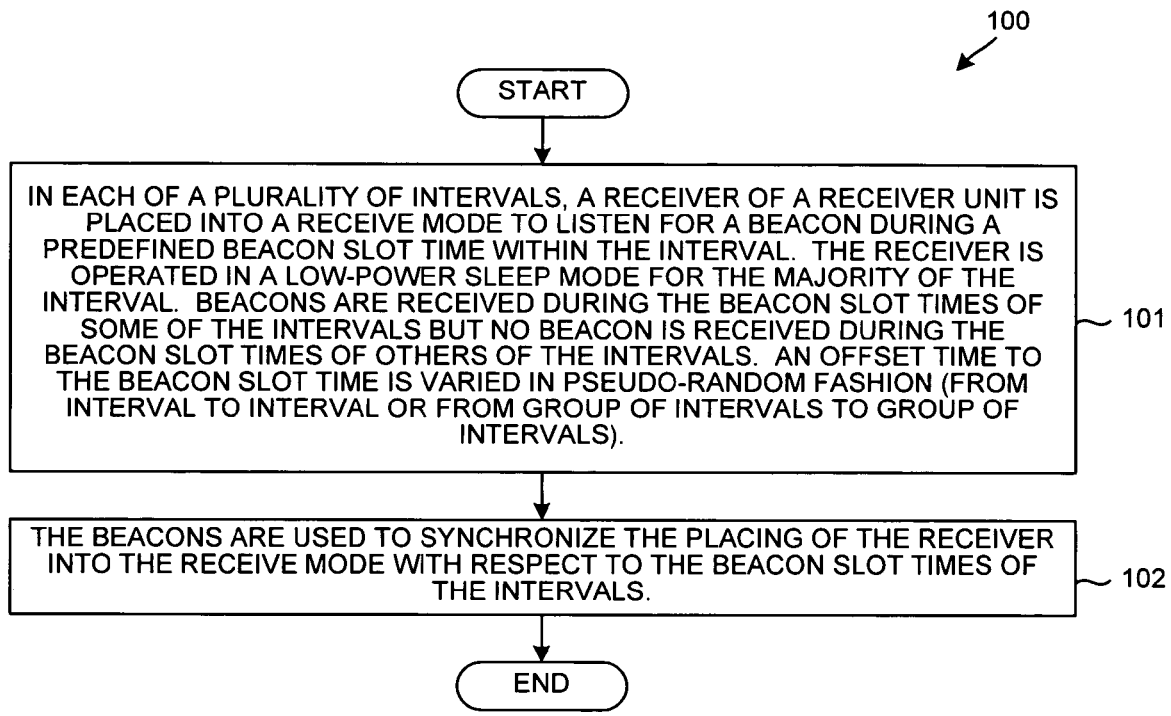
FIG. 20 is a flowchart that illustrates a time-hopping method in accordance with one novel aspect.

FIG. 20 is a simple flowchart of a method 100. Although two blocks 101 and 102 are shown, with an arrow extending from one block to the other, this diagram is just a schematic representation of the method. In one example, both steps are performed at the same time on a continuous basis, interval to interval.

In step 101, a receiver of a receiver unit is placed into a higher power receive mode to listen for a beacon during a beacon slot time within the interval. The receiver is operated in a lower power sleep mode for the majority of the interval. Beacons are received during the beacon slot times of some of the intervals but no beacon is received during the beacon slot times of others of the intervals. The offset time from a point in the interval (for example, the beginning of the interval) to the beacon slot time (for example, to the beginning of the beacon slot time) is varied in pseudo-random fashion. The offset times can be varied from interval to interval (see FIG. 10) or from group of intervals to group of intervals (see FIG. 9).

In one specific example, the receiver unit implements a table lookup function. From interval to interval, the index to the table lookup function is changed such that the table lookup function outputs a different value. Each output value of the table lookup function corresponds to a different offset time so that changing the index from interval to interval results in the offset time being changed from interval to interval. In some embodiments, each beacon includes an index value, and the receiving unit can use the index value communicated in the beacon to set a starting index value for the table lookup function. The table lookup function is implemented in software that is stored in memory 41 and that is executed by microcontroller 29 of FIG. 6.

In step 102, the beacons are used to synchronize the placing of the receiver into the receive mode with respect to the beacon slot times of the intervals.

Although certain specific embodiments are described above for instructional purposes, the teachings of this patent document have general applicability and are not limited to the specific embodiments described above. Rather than employing a table lookup function to determine the next offset value or otherwise to determine when to transmit and/or when to receive a beacon, a pseudo-random number generator can be used if more processing/power resources are available to perform that pseudo-random number generation routine. The pseudo-random number generator can be made to output another pseudo-random number for each successive interval or for each successive beacon. A beacon be can used to communicate a seed for initializing the pseudo-random number generator. Although the intervals are all of the same duration in the examples of the time-hopping protocol described above, in other examples the duration of intervals are varied in pseudo-random fashion. Accordingly, various modifications, adaptations, and combinations of various features of the described embodiments can be practiced without departing from the scope of the invention as set forth in the claims.

What is claimed is:

1. A time-hopping wireless network system comprising:
a master unit; and
a remote lighting control unit, wherein the master unit is in wireless Radio Frequency (RF) communication with the remote lighting control unit, wherein the master unit transmits beacons in some but not all of a plurality of beacon slot times, wherein there is one beacon slot time in each of a corresponding one of a plurality of intervals, wherein the intervals of the plurality of intervals are all of identical duration, wherein the beacon slot times of a sequence of the plurality of intervals vary in time within their respective intervals from interval to interval in the sequence of intervals, and wherein the remote lighting control unit only transmits if commanded to by a beacon received from the master unit.

2. The time-hopping wireless network system of claim 1, wherein the remote lighting control unit wakes up and operates in a higher power receive mode during a portion of each interval to listen for a beacon even if the master unit does not transmit a beacon during said each interval, and wherein the lighting control unit operates in a lower power sleep mode for a majority of said each interval.

3. The time-hopping wireless network system of claim 2, wherein the beacon slot time of an interval has an offset time with respect to a time point within the interval, wherein the offset times of the beacon slot times of the sequence are varied in pseudo-random fashion from interval to interval in the sequence of intervals, and wherein the time point is taken from the group consisting of: a start time of the interval, an end time of the interval, and a time point of the interval between the start time and the end time.

4. A method comprising:
(a) in each of a plurality of intervals placing a receiver of a receiver unit into a receive mode, and then listening for a beacon during a predefined beacon slot time within the interval, and operating the receiver in a low-power sleep mode for substantially all the rest of the interval, wherein beacons are received by the receiver during the beacon slot times of some of the intervals but wherein no beacon is received during the beacon slot times of others of the intervals, wherein the beacon slot time of an interval has an offset time with respect to a time point within the interval, and wherein the offset time is varied in pseudo-random fashion from interval to interval; and
(b) using the beacons received in (a) to synchronize the placing of the receiver into the receive mode with respect to the beacon slot times of the intervals.

5. The method of claim 4, wherein the receiver unit includes a transmitter, and wherein the receiver unit does not transmit from its transmitter unless being first commanded to by a beacon.

6. The method of claim 5, wherein the receiver unit is a fluorescent lamp starter unit, wherein one of the beacons includes a command, and wherein the command causes the receiver unit to turn off a fluorescent lamp.

7. The method of claim 5, wherein the receiver unit is a fluorescent lamp starter unit, wherein one of the beacons includes a command, and wherein the command causes the receiver unit to turn on a fluorescent lamp.

8. The method of claim 4, wherein the receiver unit implements a table lookup function, wherein a beacon is received onto the receiver unit, wherein the beacon includes a value, wherein the receiver unit supplies the value to the table lookup function such that the table lookup function outputs an offset control value, and wherein the offset control value is used to determine when to listen for a beacon within an interval.

9. The method of claim 8, wherein the time point is taken from the group consisting of: a start time of the interval, an end time of the interval, and a time point of the interval between the start time and the end time.

10. The method of claim 4, wherein the receiver unit implements a table lookup function, wherein the table lookup function outputs a pseudo-random sequence of offset control values, and wherein each offset control value is used to determine when to listen for a beacon within an interval.

11. The method of claim 4, further comprising:
(c) in a synchronization mode using a sliding listening window technique in a plurality of intervals to detect a beacon.

12. The method of claim 4, further comprising:
(c) receiving a beacon, wherein the beacon includes an identifier that identifies the receiver unit, and wherein the receiver unit includes a transmitter; and
(d) using the identifier to determine that the receiver unit is to make a transmission, and then transmitting a signal from the receiver unit.

13. The method of claim 12, wherein the signal is indicative of whether the receiver unit is synchronized to beacons received onto the receiver unit in (a).

14. A system comprising:
an occupancy detector that transmits a plurality of beacons, wherein each beacon is transmitted in a beacon slot time of a respective one of a plurality of intervals, wherein the beacon slot time of an interval has an offset time with respect to a time point within the interval, wherein the offset time is varied in pseudo-random fashion from interval to interval, and wherein the occupancy detector transmits no beacon in some beacon slot times of some of the intervals but does transmit beacons in beacon slot times of other ones of the intervals; and a fluorescent lamp starter unit that receives the beacons and uses the beacons to synchronize the placing of a receiver of the fluorescent lamp starter unit into a receive mode with respect to the beacon slot times of the intervals, wherein the receiver is placed into the receive mode during the beacon slot time of every one of the plurality of intervals.

15. The system of claim 14, wherein the time point is taken from the group consisting of: a start time of the interval, an end time of the interval, and a time point of the interval between the start time and the end time.

16. An apparatus comprising:
a pair of terminals adapted to be coupled to a fluorescent lamp; and
means for turning on the fluorescent lamp and for using a time-hopping Radio Frequency (RF) network protocol to receive a plurality of beacons, wherein each of a plurality of intervals has a beacon slot time, wherein the plurality of beacons is received by the means during the beacon slot times of some of the intervals but wherein no beacon is received during the beacon slot times of others of the intervals, wherein the means wakes up and operates in a higher power receive mode during a portion of each interval to listen for a beacon even if there is no beacon to receive during said each interval, wherein the means operates in a lower power sleep mode during a majority of each interval, and wherein the beacon slot times of at least some of the intervals vary in time-position within their respective intervals.

17. The apparatus of claim 16, wherein at least one of the beacons includes a value, and wherein the means is also for using the value to determine when to start operating in the higher power receive mode.

18. The apparatus of claim 16, wherein the means is also for turning off the fluorescent lamp.

19. The apparatus of claim 16, wherein the beacon slot times of a first sequence of intervals all have a first time-position within their respective intervals, wherein the beacon slot times of a second sequence of intervals all have a second time-position within their respective intervals, and wherein the first and second time-positions are different.

20. The apparatus of claim 16, wherein beacon slot times of a sequence of intervals vary in time-position within their respective intervals from interval to interval throughout the sequence.

* * * * *